United States Patent [19]

Dey

[11] Patent Number: 5,069,528

[45] Date of Patent: Dec. 3, 1991

[54] REMOTE OPTICAL ALIGNMENT METHOD

[75] Inventor: Thomas W. Dey, Springwater, N.Y.

[73] Assignee: Eastman Kodak Company, Rochester, N.Y.

[21] Appl. No.: 516,013

[22] Filed: Apr. 26, 1990

[51] Int. Cl.$^5$ .................. G02B 26/02; G01B 11/00
[52] U.S. Cl. ............................. 359/233; 356/401; 359/900
[58] Field of Search ............ 350/272, 273, 275, 320, 350/321; 356/399–401

[56] References Cited

U.S. PATENT DOCUMENTS

| 4,643,579 | 2/1987 | Toriumi et al. | 356/401 |
| 4,890,918 | 1/1990 | Monford | 356/399 |

*Primary Examiner*—Bruce Y. Arnold
*Assistant Examiner*—James Phan
*Attorney, Agent, or Firm*—Stephen C. Kaufman

[57] ABSTRACT

A novel method that is suitable for uniquely aligning remote first and second objects. In one aspect, the method comprises pre-alignment and alignment stages. The pre-alignment stage comprises generating first and second geometric configurations on the first and second objects, respectively. The first configuration is, at least in part, characterized by randomness; and, the second configuration comprises a geometric complement of a projection of the first configuration. The alignment stage exploits variable geometries generated in the process of manipulating each of the two objects through six degrees of freedom, until a unique geometry, signifying alignment, is realized.

2 Claims, 15 Drawing Sheets

REMOTE OPTICAL ALIGNMENT METHOD

CROSS-REFERENCE TO A RELATED APPLICATION

This application is related to U.S. application Ser. No. 07/516,006 filed Apr. 26, 1990 by Dey, which application is being filed contemporaneously with this application. The entire disclosure of this application is incorporated by reference herein. Each of these applications is copending and commonly assigned.

FIELD OF THE INVENTION

This invention relates to an optical alignment method.

INTRODUCTION TO THE INVENTION

Optical alignment methods are well-known, and vital. The alignment methods may be employed, for example, to realize an alignment of rotating machinery in power plants, or an alignment of parts in heavy machine tools, etc.

In general, one important purpose of optical alignment methods is to position and orient an object at a distance to a reference set of coordinates. Since the object has six degrees of freedom (three in translation, and three in rotation), the purpose of the optical alignment method becomes that of constraining the object in all six of these degrees of freedom: positioning, which constrains the object in translation; and, auto-collimation, which constrains the object in rotation. Conventional alignment telescopes may be employed, for example, for realizing these constraints.

SUMMARY OF THE INVENTION

I have been working on an optical alignment method that is different from the alignment telescope, and which incorporates an analysis of Moiré fringes, as generated by way of a pair of inter-active Ronchi rulings.

To explain this last method, attention is directed to FIGS. 1–6. In particular, FIG. 1 shows a conventional straight line Ronchi ruling 10. The straight line Ronchi ruling 10 comprises a known amplitude grating comprising spaced-apart ruling bands 12. FIGS. 2a, b, in turn, show a pair of Ronchi rulings 14 and 16, where each of the Ronchi rulings 14 and 16 comprises identical Ronchi rulings, of the type shown in FIG. 1. It is now to be imagined that the FIG. 2 Ronchi rulings 14 and 16 individually represent a pair of planar faces for two objects 18, 20, and of whose mutual alignment one desires to effect.

Now, if the two objects 18, 20 are identically or congruently juxtaposed, or aligned, then a resulting composite Ronchi ruling will be identical to that shown in FIG. 1, above. On the other hand, if the two objects 18, 20 cannot be identically or congruently juxtaposed or aligned, as in FIG. 3, where the two objects are offset by an angle $\theta$, then a resulting composite Ronchi ruling will be that of the type shown in FIG. 4, comprising Moiré FIGS. 22. Restated, the FIG. 4 Moiré FIGS. 22 are generated when the two Ronchi rulings 14, 16 are juxtaposed at the angle $\theta$: an indicia of the mis-alignment of the two objects 18, 20, therefore, is the existence of the Moiré fringes.

The Ronchi-Moiré method has an apparent advantage of simplicity, but I have discovered various problems and difficulties with it, which may offset the advantage. For example, as shown in FIG. 5, the two objects 18, 20 may be linearly displaced, $\Delta Y$, and therefore only partially aligned. The resulting composite Ronchi ruling will not induce Moiré fringes; nevertheless, the objects 18, 20 are clearly not entirely aligned, due to the linear displacement. As another off-setting example, shown in FIG. 6, there may be an apparent alignment, as suggested by a nominal or less than visually distinctive Moiré fringe pattern 24 generated by curved Ronchi rulings; nevertheless, a desired accuracy of alignment may be thwarted, due to an inherent human subjectivity in "reading" the Moiré fringe pattern 24. Finally, while the Ronchi-Moiré method may asymptotically approach the required state of congruency or alignment, this state may not be uniquely evidenced. This last insight is a key to why the Ronchi-Moiré method must remain largely subjective.

I have now discovered a novel method that is suitable for uniquely aligning remote first and second objects.

In a first aspect of the present invention, the novel method comprises a pre-alignment stage comprising the two steps of (1) generating a first geometric configuration on a first object, the first geometric configuration comprising dark and clear regions having at least one portion characterized by randomness; and, (2) generating on a second object a geometric configuration which is a geometric complement of a projection of the first random geometric configuration, as generated from a remote viewing location.

The novel method further comprises an alignment stage comprising the following six steps:

(1) placing the first and second objects along a common optical axis from the remote viewing location so that the first geometric configuration and its projected complement generate a unique dark spot;

(2) transversely translating at least one of the first and the second objects in a direction orthogonal to the common optical axis, for centering the dark spot on the common optical axis;

(3) tilting at least one of the first and second objects toward or away from the common optical axis for maximizing the circularity of the dark spot;

(4) longitudinally translating at least one of the first and the second objects in a direction along the common optical axis for expanding the dark spot;

(5) rotating at least one of the first and second objects about the common optical axis, for further expanding the dark spot; and (6) repeating steps 2 through 5 until the dark spot substantially fills the portion of the first geometric configuration characterized by randomness.

In a second aspect of the present invention, the novel method comprises a pre-alignment stage, the pre-alignment stage comprising the two steps of (1) generating a first geometric configuration on a first object, the first geometric configuration comprising dark and clear regions having at least one portion characterized by randomness; and, (2) generating on a second object a geometric configuration which is a positive geometric projection of the first random geometric configuration, as generated from a remote viewing location;

and an alignment stage comprising the steps of:

(3) placing the first and second objects along a common optical axis from the remote viewing location so that the first geometric configuration and its positive geometric projection generate a unique grey spot;

(4) transversely translating at least one of the first and the second objects in a direction orthogonal to the common optical axis, for centering the grey spot on the common optical axis;

(5) tilting at least one of the first and second objects toward or away from the common optical axis for maximizing the circularity of the grey spot;

(6) longitudinally translating at least one of the first and the second objects in a direction along the common optical axis for expanding the grey spot;

(7) rotating at least one of the first and second objects about the common optical axis, for further expanding the grey spot; and (8) repeating steps 4 through 7 until the grey spot substantially fills the portion of the first geometric configuration characterized by randomness.

BRIEF DESCRIPTION OF THE DRAWING

The invention is illustrated in the accompanying drawing, in which.

DETAILED DESCRIPTION OF THE INVENTION

The detailed description of the invention follows the format of the invention as summarized above.

The Pre-Alignment Stage

As summarized above, the pre-alignment stage of the first aspect of the present invention comprises (1) generating a first geometric configuration on a first object, the first geometric configuration comprising dark and clear regions having at least one portion characterized by randomness; and, (2) generating on a remote second object a geometric configuration which is a geometric complement of a projection of the first geometric configuration, as generated from a remote viewing location. An example of the pre-alignment stage is shown in FIG. 7.

Figure 1:
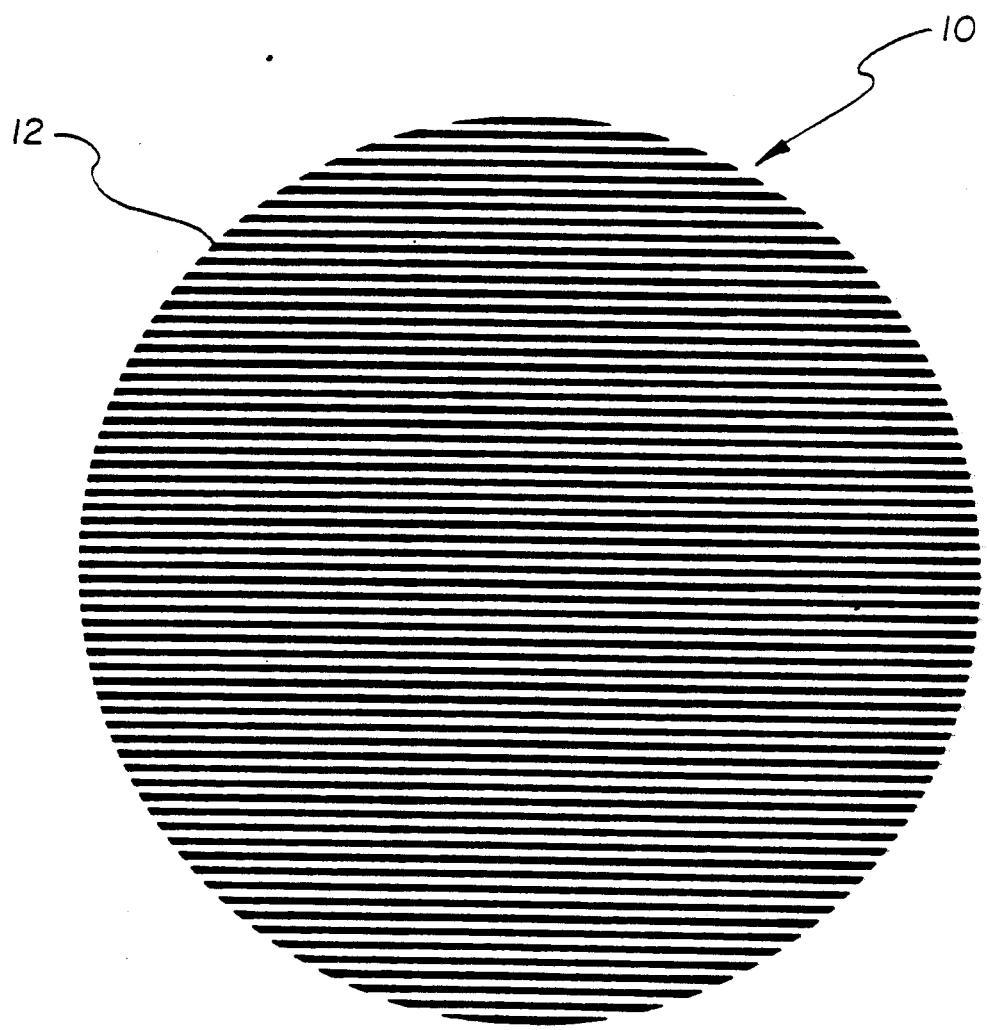
FIG. 1 shows a conventional straight line Ronchi ruling.
Figure 2A:
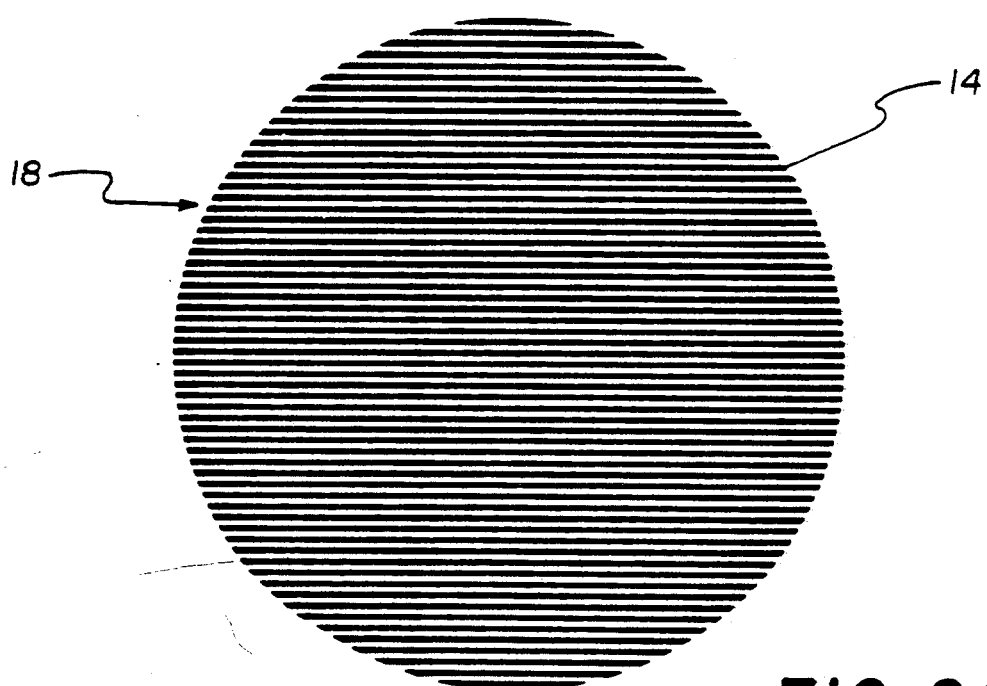
FIGS. 2A, B, show a pair of conventional Ronchi rulings.
Figure 2B:
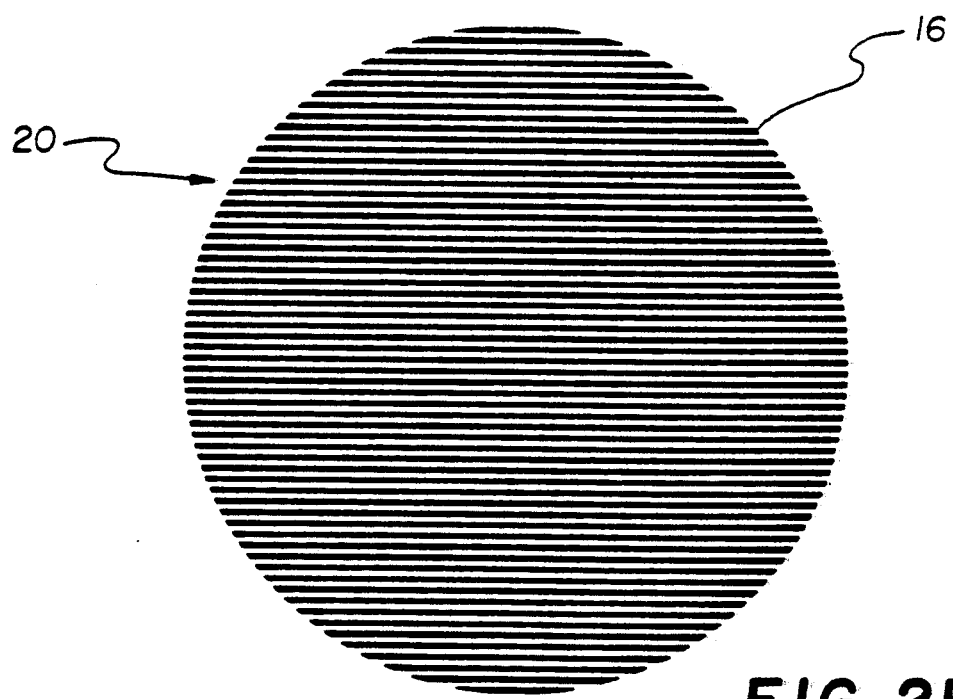
Figure 3:
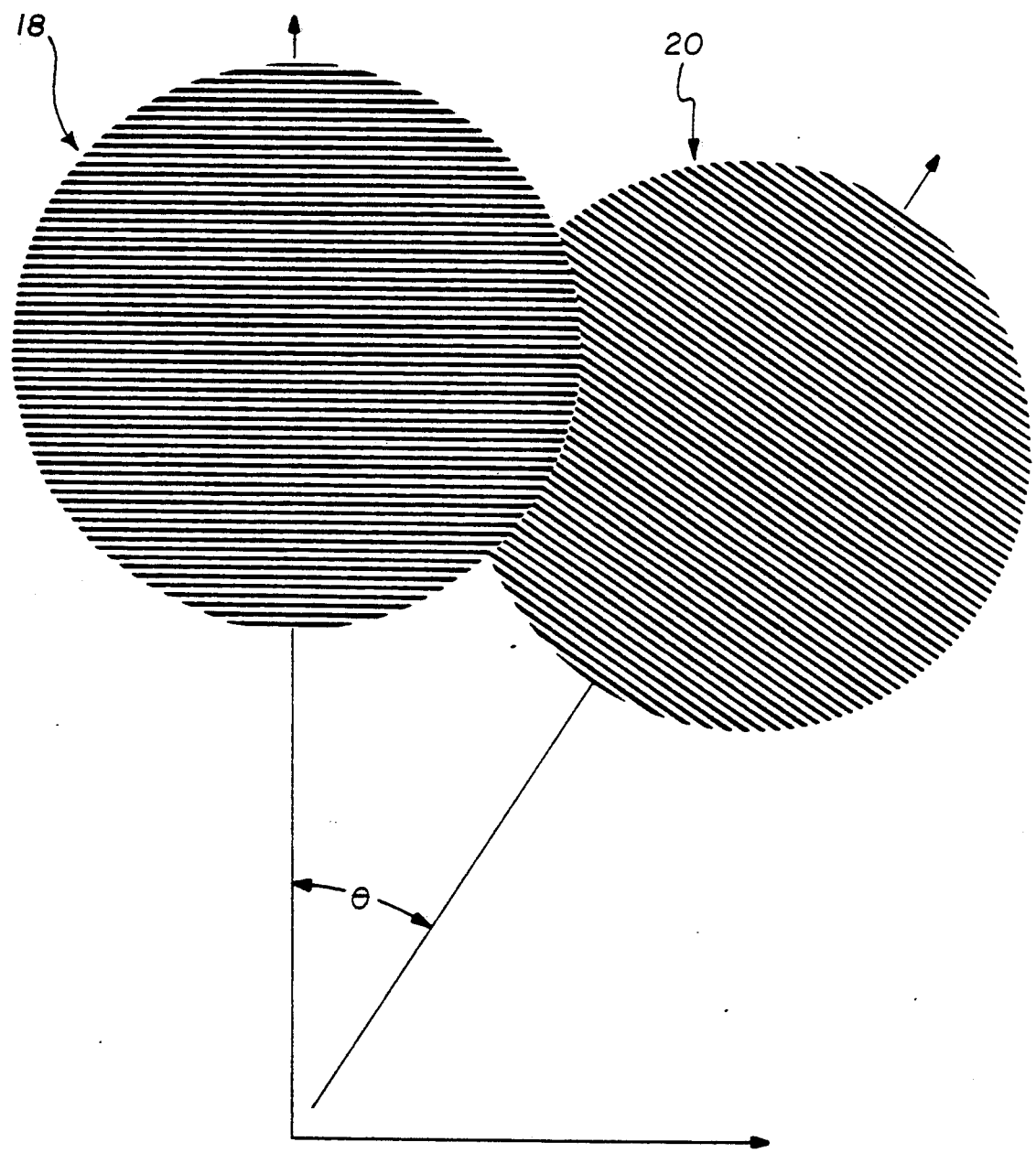
FIG. 3 shows a pair of juxtaposed Ronchi rulings, offset by an angle.
Figure 4:
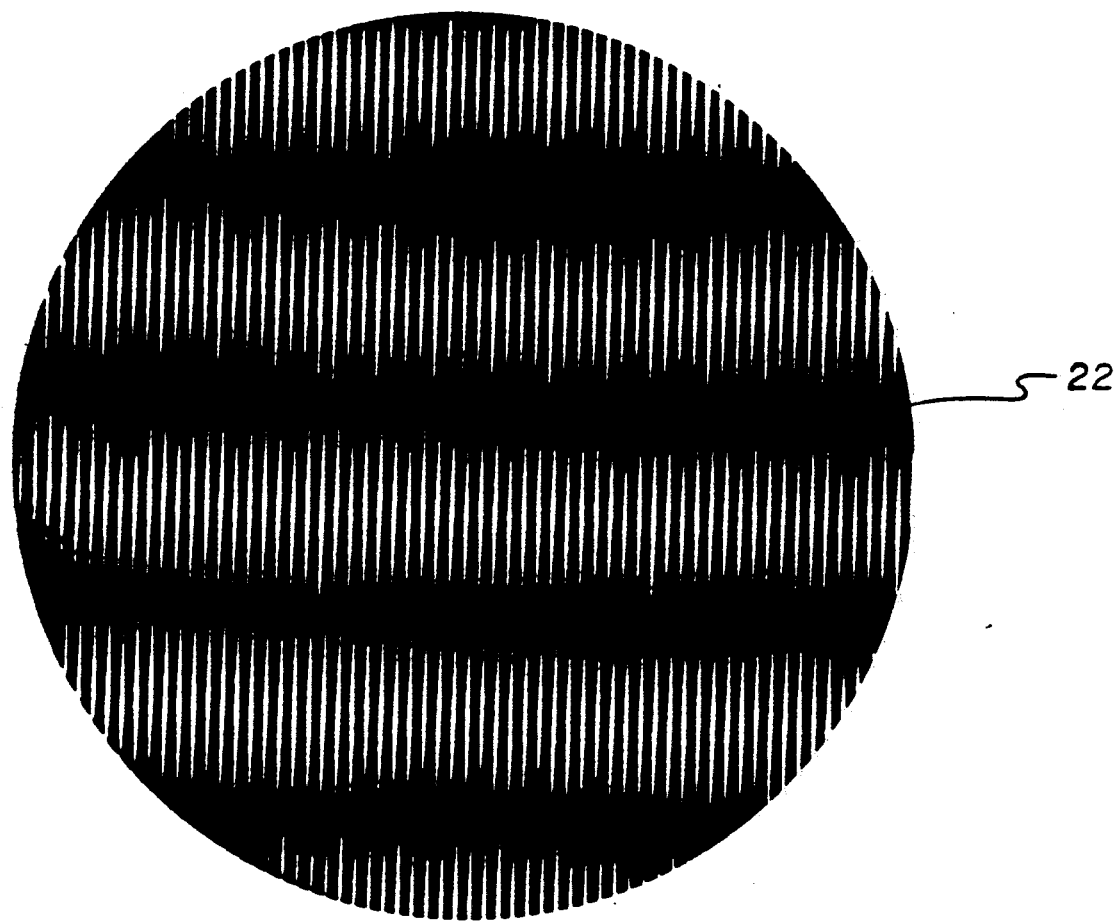
FIG. 4 shows a Moiré fringe pattern generated by the FIG. 3 Ronchi rulings.
Figure 5:
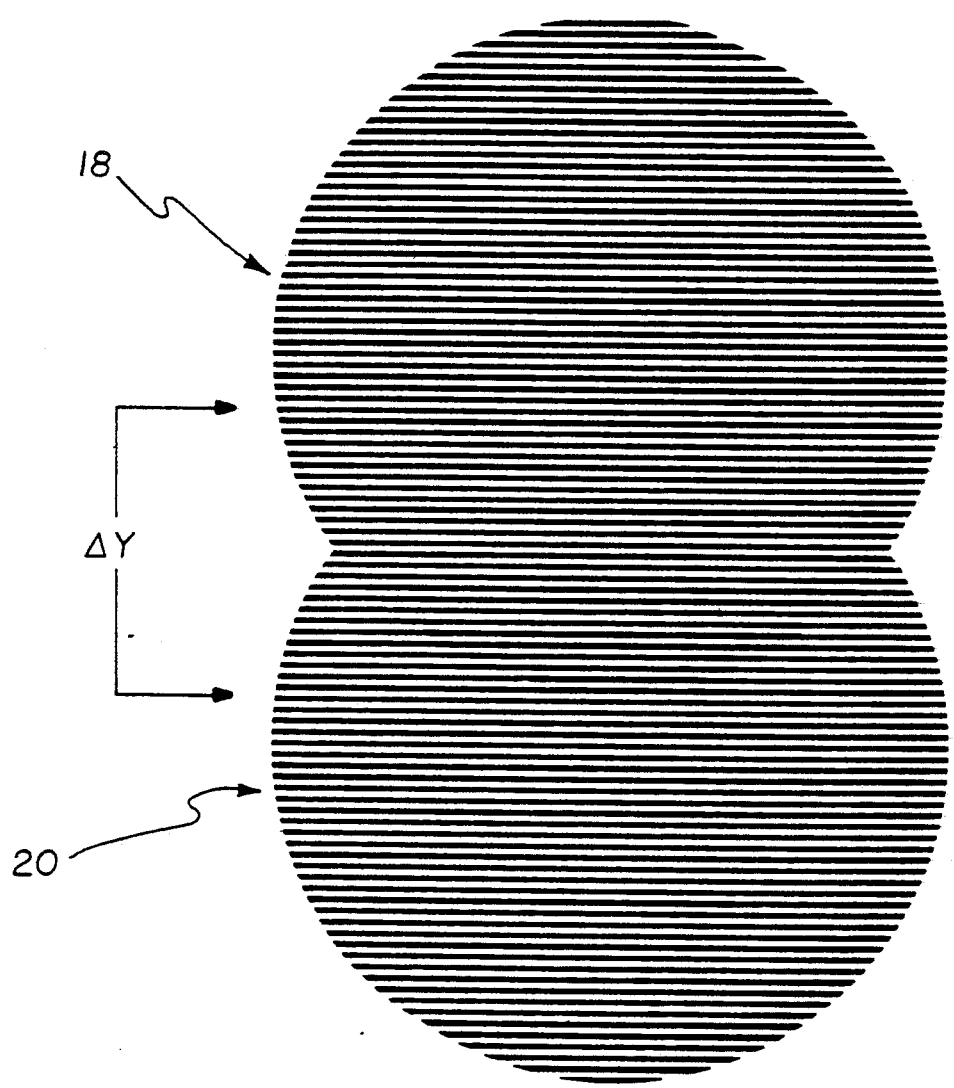
FIG. 5 shows a pair of planar faces for two objects, linearly displaced.
Figure 6:
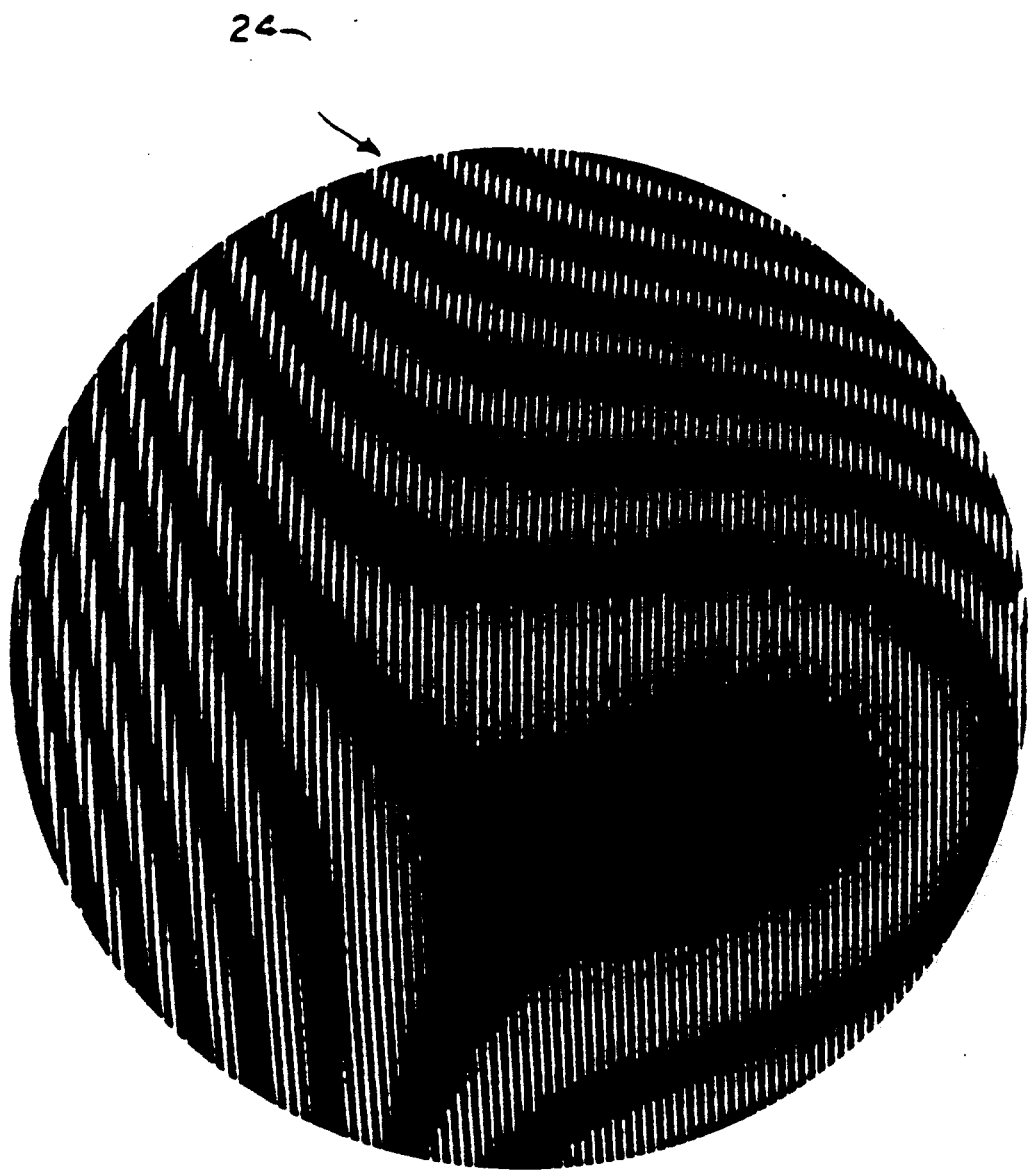
FIG. 6 shows a visually non-distinctive Moiré pattern.
Figure 7:
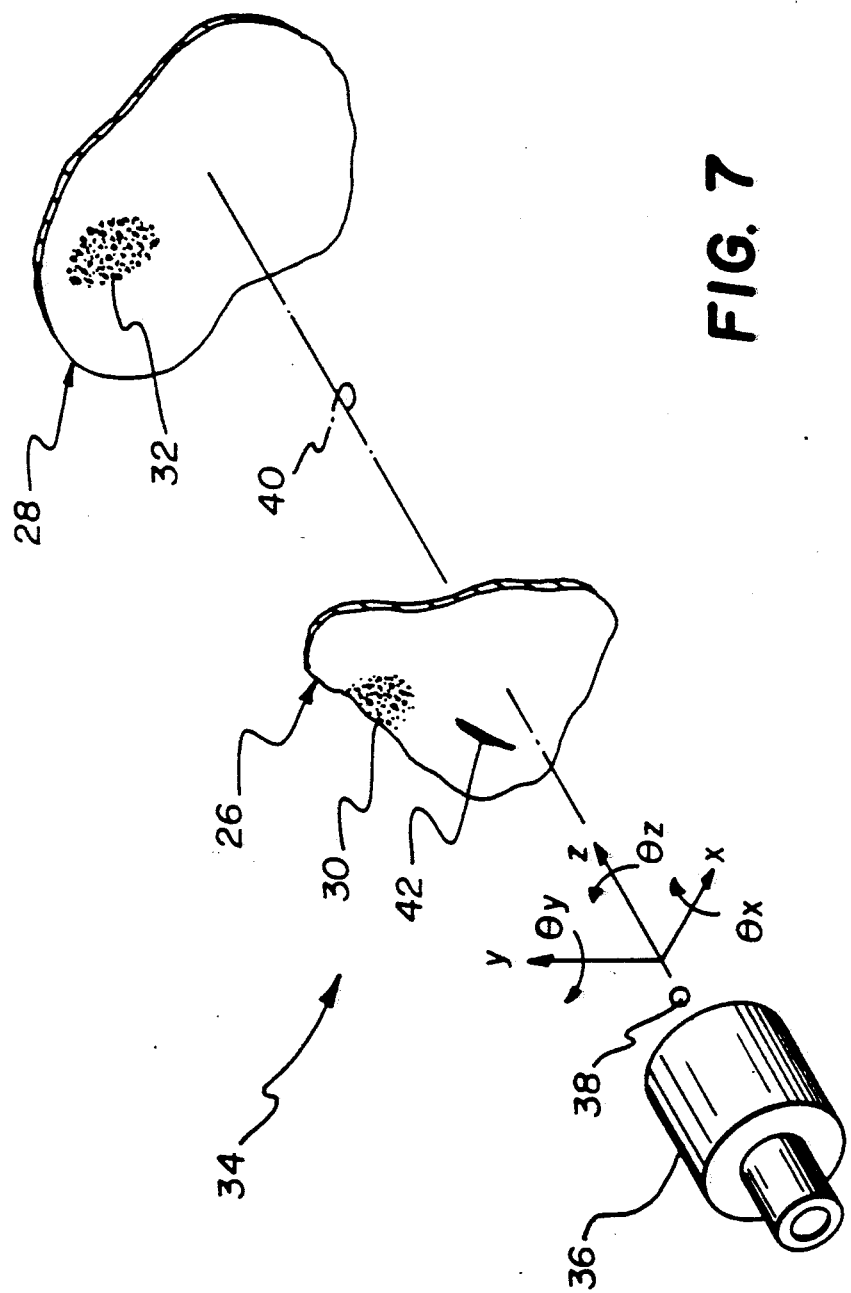
FIG. 7 shows an optical assembly that may be employed in a pre-alignment stage and an alignment stage, of the present invention.

FIG. 7, accordingly, shows a first object 26, and a remote or spaced-apart second object 28. By remote or spaced-apart, I mean that the separation between the first and second objects is greater than 10% of the maximum diameter of the objects. Alternatively, by remote or spaced-apart, I mean that for most practical applications of my method, the objects may be separated by at a distance of at least 10 cm, preferably at least 1000 cm, for example 100 meters.

The first and second objects (26, 28) may comprise substantially planar sheets of mylar, or clear plastic sheets. Alternatively, the first and second objects (26, 28) may comprise substantially transparent sheets of paper, or thin photographic glass plate. Preferably, the first and second objects (26, 28) comprise a film base, for example, a film base available in an Eastman Kodak Estar AH product. The film base is preferred because it can facilitate the step of generating the geometric configurations.

FIG. 7 shows that the first object 26 comprises a random and monolithic dark and clear dot pattern 30. The random dark and clear dot pattern 30 may be generated by a conventional computer using conventional software techniques. The random dark dots (black) have a size which is preferably greater than 10.0 microns, especially preferably greater than 100.0 microns, most especially greater than 1.0 millimeter. By dark or black dots, I mean those having a transmissivity of approximately 0.0, in contrast to the clear areas, which have a transmissivity of approximately 1.0.

FIG. 7 further shows that the second object 28 comprises a geometric configuration 32 which is a geometric complement of a projection of the first random dot pattern 30. The geometric configuration 32 may be generated in the following way.

First, as shown in FIG. 7, there is provided an optical assembly 34 comprising a remote viewing device 36, for example, a telescope, the telescope preferably comprising a light source 38. The remote viewing device 36, the light source 38, and the first and second objects 26, 28 are aligned on a common optical axis 40.

The optical assembly 34 may be employed for generating the geometric configuration 32. Thus, as generated from the perspective of the remote viewing device 36, one maps or projects, along the common optical axis 40, the first objects 26 random dot pattern 30, into a geometric complement, on the second object 28. By geometric complement, I mean that black dots in the random pattern 30 are mapped or projected to clear areas, in the geometric configuration 32, and that clear areas in the random pattern 30 are mapped or projected to black dots, in the geometric configuration 32. The geometric complement is preferably effected by way of conventional lithography techniques, so that the geometric configuration 32 corresponds to a photonegative of the random dot pattern 30, as viewed from the remote viewing device 36.

The Alignment Stage

The alignment stage of the first aspect of the present invention comprises six substeps, as summarized above. These steps are now discussed in order, with continued reference to FIG. 7.

(1) Placing the first and second objects along a common optical axis from the remote viewing location, so that the first geometric configuration and its projected complement generate a unique dark spot.

Figure 8:
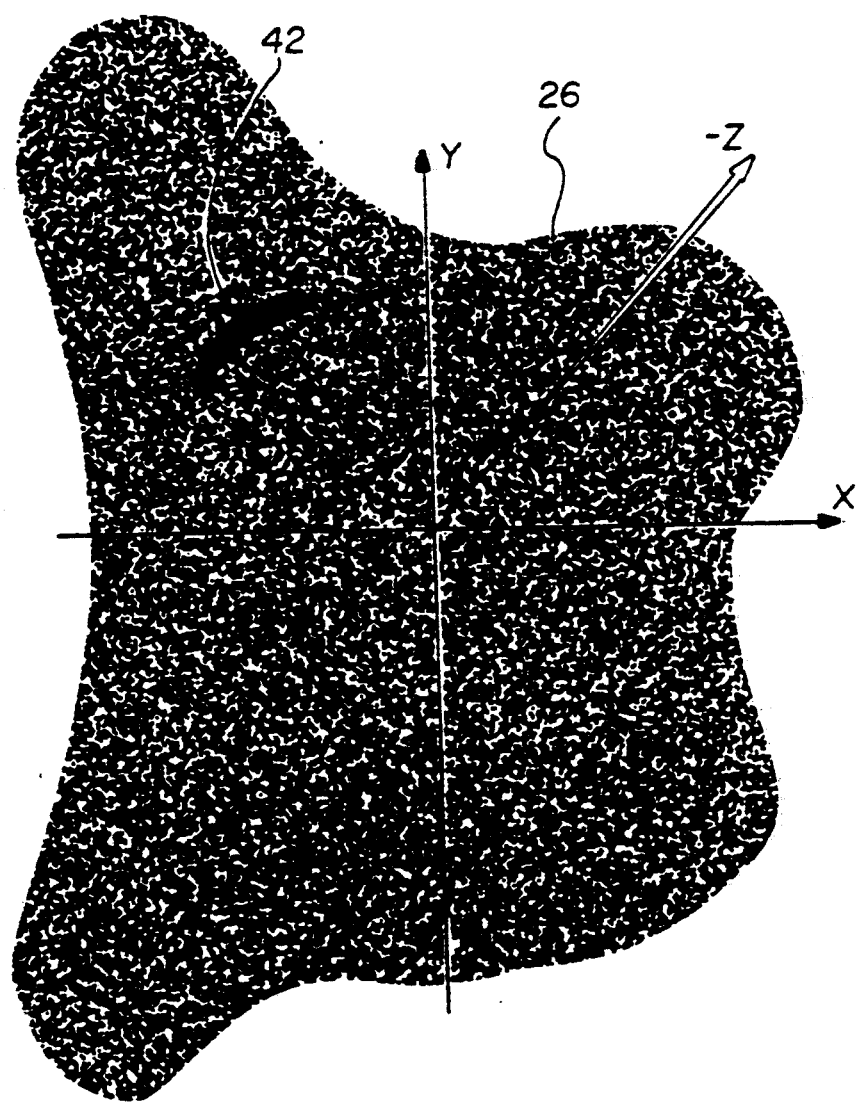
FIG. 8 shows a detail of a first step of an alignment stage of the present invention.

This step is now applied to the optical components shown in FIG. 7, and in particular, utilizes its coordinate system (x, y, z $\theta_x$, $\theta_y$, $\theta_z$) which is centered on the common optical axis 40. Thus, the first and second objects 26, 28 are placed along the common optical axis 40 from the remote viewing location 36, so that the first geometric configuration comprising the random dot pattern 30, and its projected complement comprising the geometric configuration 32, generate a unique dark spot 42 on the first object 26, as shown in a FIG. 8 detail. FIG. 8 shows, therefore, that the unique dark spot 42 has been generated by suitable translational and/or rotational manipulations of the two objects 26, 28, along the common optical axis 40.

(2) Tranversely translating at least one of the first and second objects in a direction orthogonal to the common optical axis, for centering the dark spot on the common optical axis.

Figure 9:
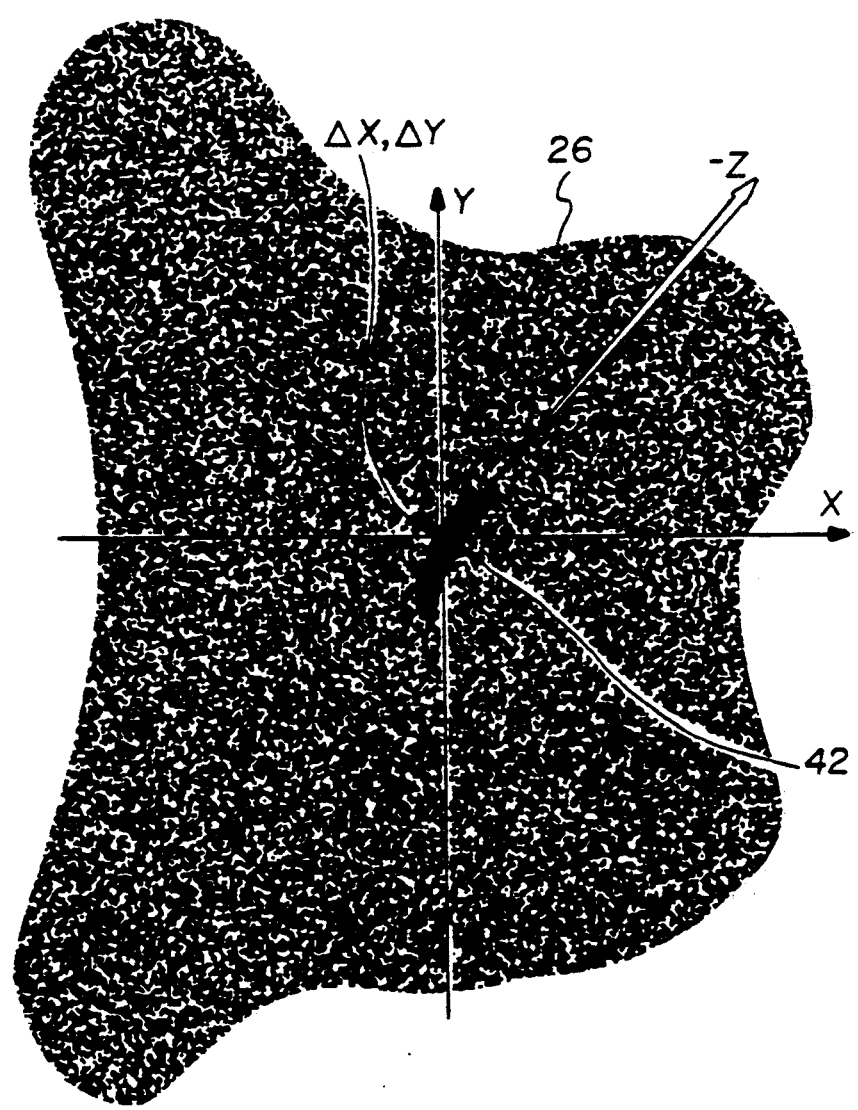
FIG. 9 shows a detail of a second step of an alignment stage of the present invention.

This step is now applied to the optical components shown in FIG. 7. Thus, for example, the first object 26 may be moved along the coordinate system so that it effects movements $\pm \Delta y$ and/or $\pm \Delta x$ (i.e., transverse translations), orthogonal to the common optical axis 40. This action centers the dark spot 42 at an origin of the common optical axis 40. The results of this step are shown in a FIG. 9 detail, which shows the dark spot 42 centered on the common optical axis 40. Note that the required movements $\pm \Delta y$, $\pm \Delta x$ are typically very slight, for most practical optical assemblies 34.

(3) Tilting at least one of the first and second objects toward or away from the common optical axis, for maximizing the circularity of the dark spot.

Figure 10:
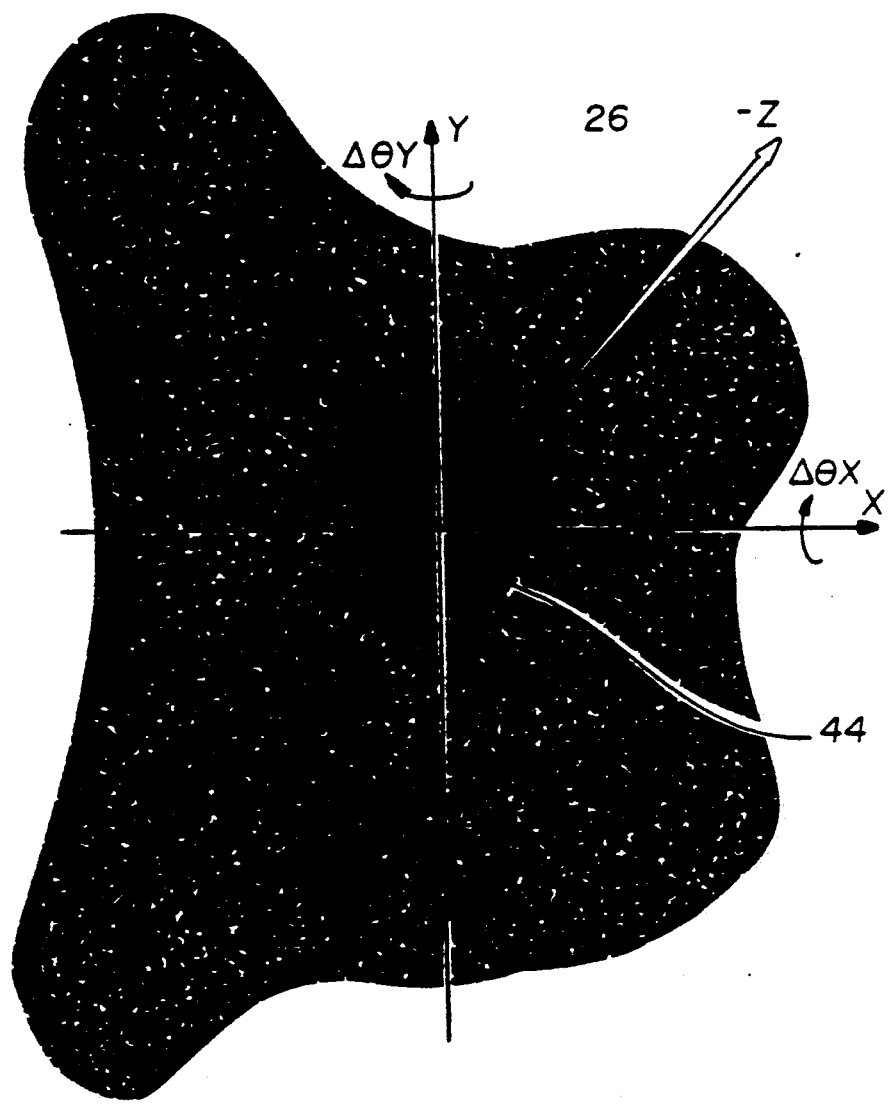
FIG. 10 shows a detail of a third step of an alignment stage of the present invention.

This step is now applied to the optical components shown in FIG. 7. Thus, for example, the first object 26 may be tilted relative to the coordinate system so that it effects movements $\pm \Delta \theta y$ and $\pm \Delta \theta x$ with respect to the common optical axis 40. This action maximizes the shape or the circularity of the dark spot 42, as compared to its original shape in FIG. 9. The results of this step are shown in a FIG. 10 detail, which shows a circular dark spot 44 centered on the common optical axis 40. The dark spot 44 has a well-defined circular shape, as especially compared to the more elliptical or arbitrary FIG. 9 shape 42.

(4) Longitudinally translating at least one of the first and second objects in a direction along the common optical axis, for expanding the dark spot.

Figure 11:
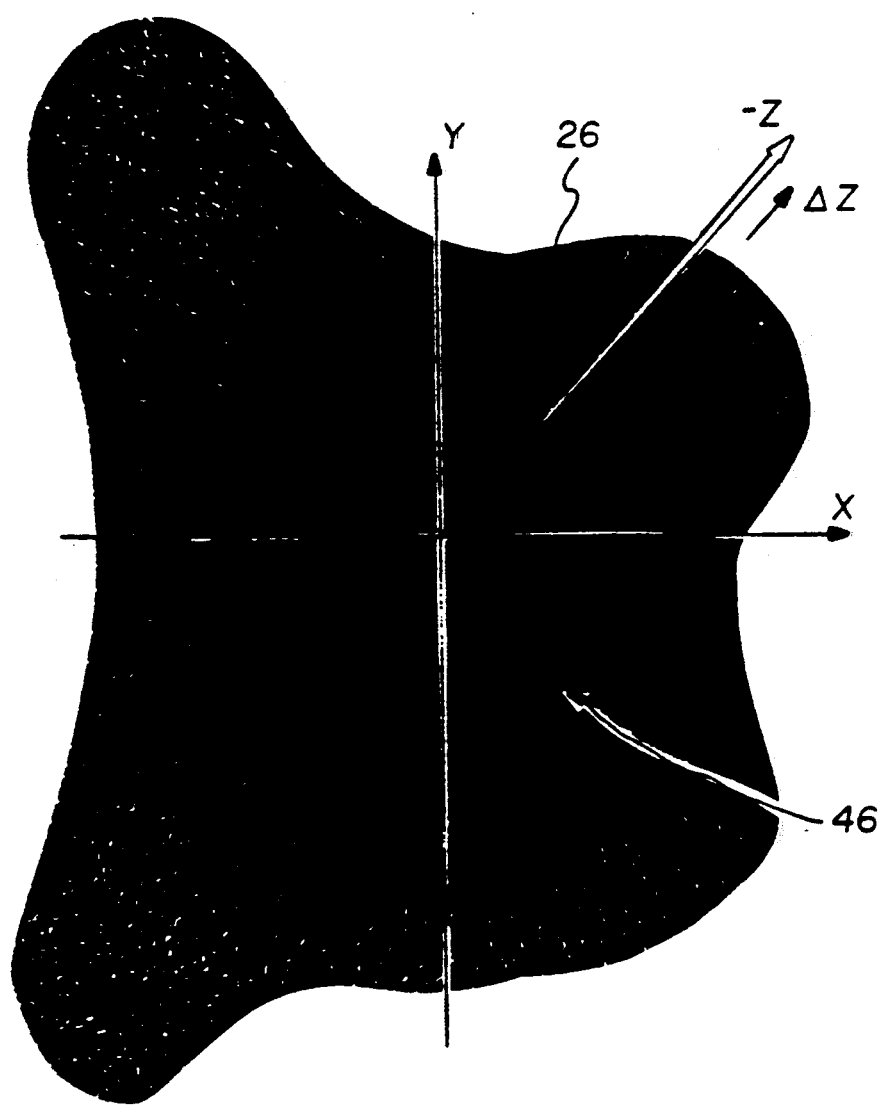
FIG. 11 shows a detail of a fourth step of an alignment stage of the present invention.

This step is now applied to the optical components shown in FIG. 7. Thus, for example, the first object 26 may be moved along the coordinate system so that it effects movements $\pm \Delta z$ (i.e., longitudinally), along the common optical axis 40. This action develops an expanded circular dark spot 46, as compared to its smaller size 44 in FIG. 10. The results of this step are shown in a FIG. 11 detail.

(5) Rotating the first or second objects about the common optical axis, for further expanding the dark spot.

Figure 12:
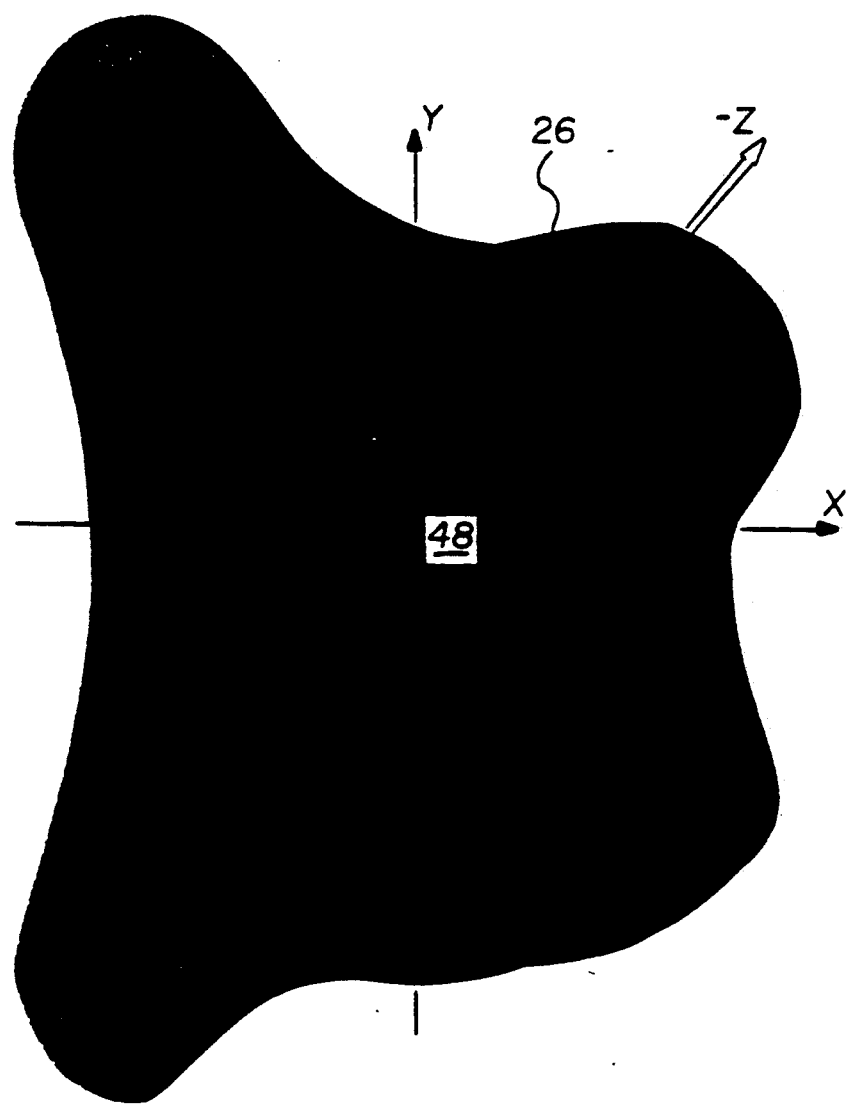
FIG. 12 shows a detail of a fifth step of an alignment stage of the present invention.

This step is now applied to the optical components shown in FIG. 7. Thus, for example, the first object 26 may be rotated about the coordinate system so that it effects a rotational movement $\Delta \theta z$. This action develops a further expanded dark spot 48, as compared to its previous diameter in FIG. 11. The results of this step are shown in a FIG. 12 detail.

(6) Repeating steps 2 through 5 until the dark spot substantially fills the portion of the first geometric configuration characterized by randomness.

Figure 13:
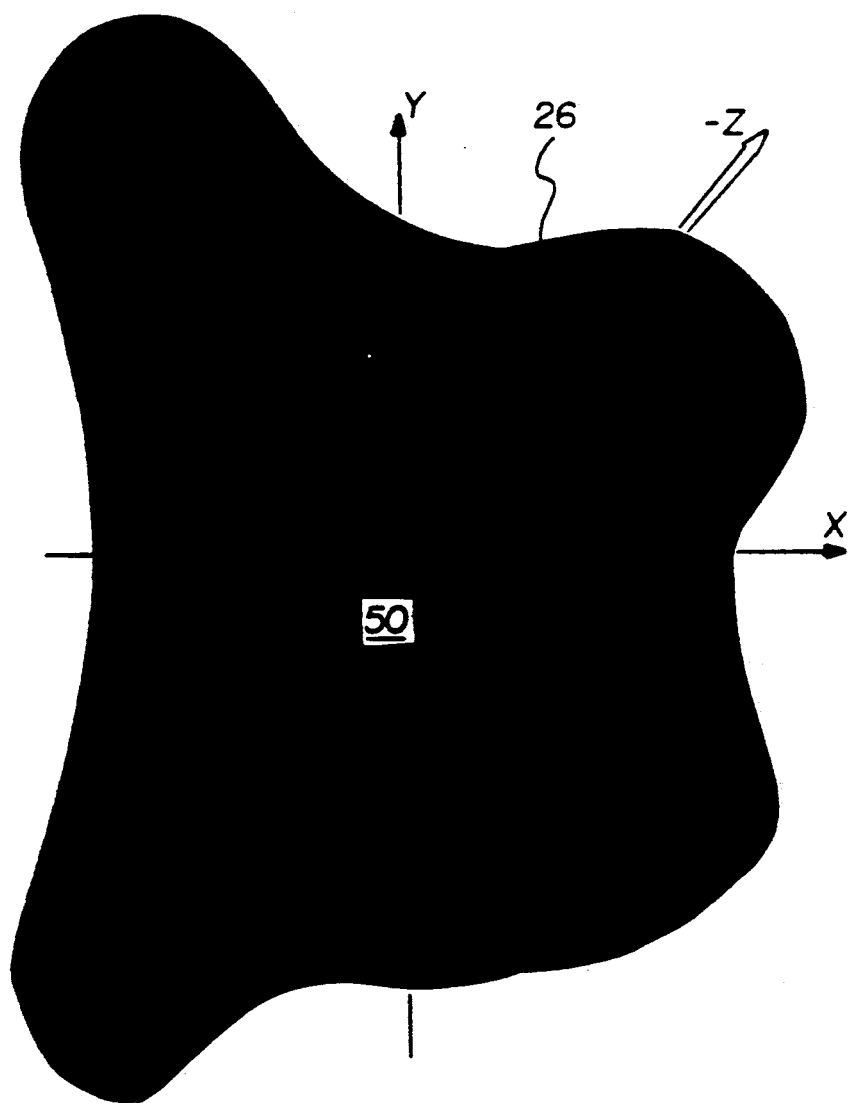
FIG. 13 shows a detail of a sixth step of an alignment stage of the present invention.

This sixth step requires a serial repetition of the previous four steps, until the dark spot 48 substantially permeates that portion of the FIG. 7 first object 26 characterized by randomness. As an upper limit to the repetition process, the dark spot 48 entirely permeates that portion of the FIG. 7 first object 26 characterized by randomness, and corresponds to a portion transmissivity equal to 0.0. The results of this cumulative step are shown in a FIG. 13 detail. Note that a final dark spot 50 substantially permeates the entire first object 26. The total dark spot 50 uniquely signifies that the two objects 26, 28 are substantially aligned to each other, in six degrees of freedom.

Figure 14:
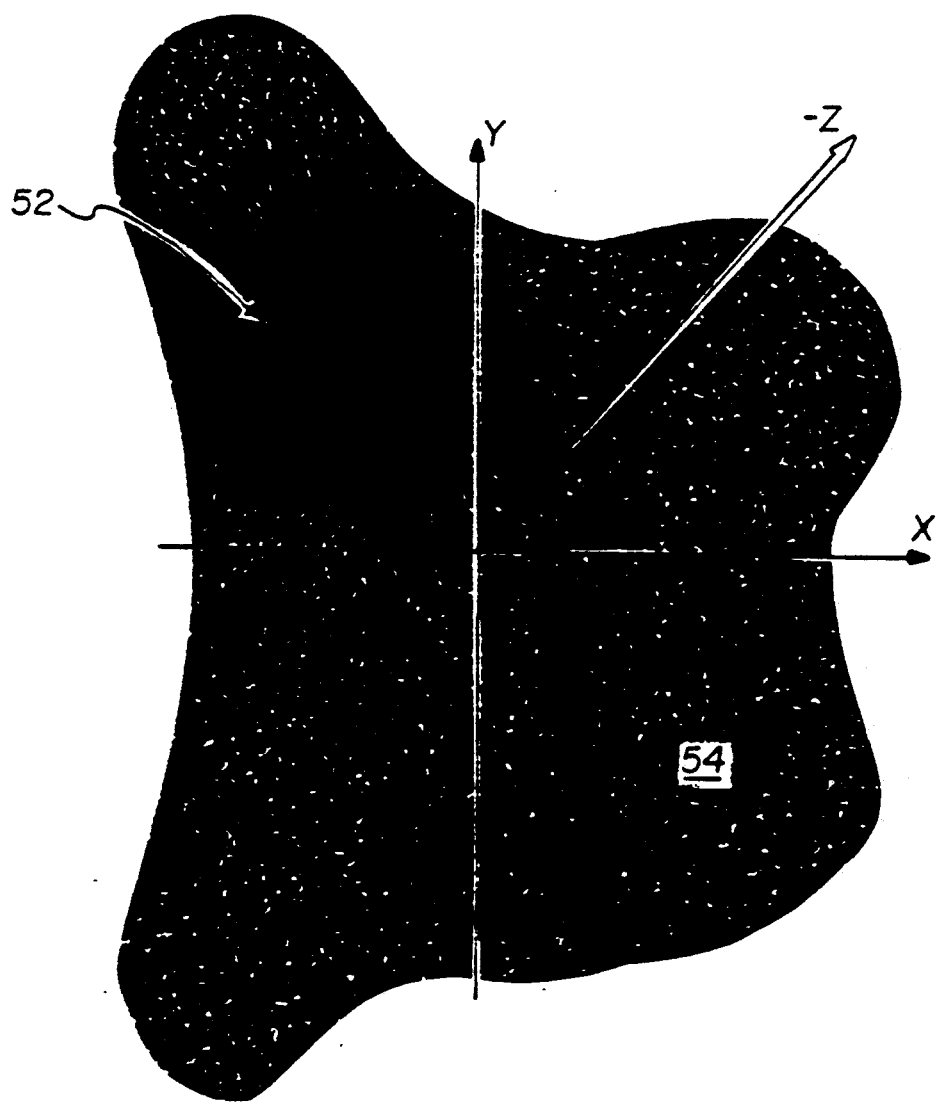
FIG. 14 shows a geometric configuration generated in an alignment stage of a second aspect of the present invention.
Figure 15:
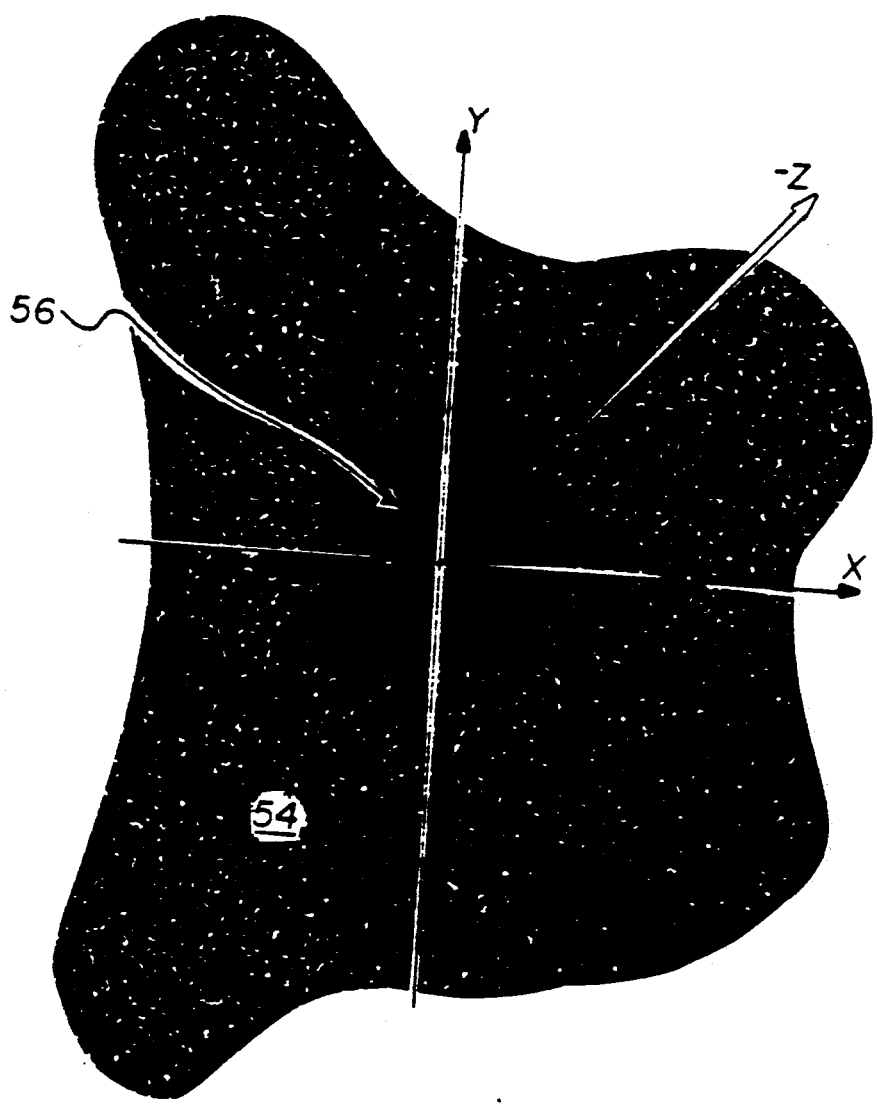
FIG. 15 shows the FIG. 14 geometric configuration further expanded as part of the alignment process.

For the second aspect of the present invention, summarized above, one may employ the FIG. 7, numeral 30 random dark and clear dot pattern twice: i.e., as a first geometric configuration, and again as its positive geometric projection. The alignment stage for this second aspect of the invention proceeds in a manner substantially identical to that discussed above for the first aspect. One difference, however, is that a unique grey spot (FIG. 14, numeral 52) is developed against a random background 54 during the alignment steps, and then expanded (FIG. 15, numeral 56), until the grey spot substantially fills the portion of the first geometric configuration characterized by randomness.

What is claimed is:

1. A method for uniquely aligning remote first and second objects, comprising
   a pre-alignment stage, the pre-alignment stage comprising the two steps of
   (1) generating a first geometric configuration on a first object, the first geometric configuration comprising dark and clear regions having at least one portion characterized by a first random geometric configuration; and,
   (2) generating on a second object a geometric configuration which is a geometric complement of a projection of the first random geometric configuration, as generated from a remote viewing location;
   and an alignment stage comprising the steps of:
   (3) placing the first and the second objects along a common optical axis from the remote viewing location so that the first geometric configuration and its projected complement generate a unique dark spot;
   (4) transversely translating at least one of the first and the second objects in a direction orthogonal to the common optical axis, for centering the dark spot on the common optical axis;
   (5) tilting at least one of the first and the second objects toward or away from the common optical axis for maximizing the circularity of the dark spot;
   (6) longitudinally translating at least one of the first and the second objects in a direction along the common optical axis for expanding the dark spot;
   (7) rotating at least one of the first and the second objects about the common optical axis, for further expanding the dark spot; and (8) repeating steps 4 through 7 until the dark spot substantially fills the portion of the first geometric configuration characterized by randomness.

2. A method for uniquely aligning remote first and second objects, and comprising a pre-alignment stage, the pre-alignment stage comprising the two steps of
  (1) generating a first geometric configuration on a first object, the first geometric configuration comprising dark and clear regions having at least one portion characterized by a first random geometric configuration; and,
  (2) generating on a second object a geometric configuration which is a positive geometric projection of the first random geometric configuration, as generated from a remote viewing location;

and an alignment stage comprising the steps of:
  (3) placing the first and the second objects along a common optical axis from the remote viewing location so that the first geometric configuration and its positive geometric projection generate a unique grey spot;
  (4) transversely translating at least one of the first and the second objects in a direction orthogonal to the common optical axis, for centering the grey spot on the common optical axis;
  (5) tilting at least one of the first and the second objects toward or away from the common optical axis for maximizing the circularity of the grey spot;
  (6) longitudinally translating at least one of the first and the second objects in a direction along the common optical axis for expanding the grey spot;
  (7) rotating at least one of the first and the second objects about the common optical axis, for further expanding the grey spot; and
  (8) repeating steps 4 through 7 until the grey spot substantially fills the portion of the first geometric configuration characterized by randomness.

* * * * *